United States Patent [19]
Giasson et al.

[11] Patent Number: 6,058,730
[45] Date of Patent: May 9, 2000

[54] FLOW REGULATING VALVE APPARATUS FOR AIR CONDITIONING SYSTEMS

[75] Inventors: Eric J. Giasson, Somerset; George Verras, Mansfield, both of Mass.

[73] Assignee: Texas Instruments Incorporated, Dallas, Tex.

[21] Appl. No.: 09/164,601

[22] Filed: Oct. 1, 1998

Related U.S. Application Data

[60] Provisional application No. 60/072,562, Jan. 23, 1998.

[51] Int. Cl.⁷ ....................................................... G05D 23/08
[52] U.S. Cl. ...................... 62/222; 236/93 R; 236/101 D
[58] Field of Search ............................ 62/222; 236/93 R, 236/93 B, 101 D, 101 E

[56] References Cited

U.S. PATENT DOCUMENTS

| | | | |
|---|---|---|---|
| 3,008,697 | 11/1961 | Dermond | 236/93 R |
| 3,295,759 | 1/1967 | Wing | 236/93 R |
| 4,783,000 | 11/1988 | Ty | 236/93 R |
| 5,110,045 | 5/1992 | Giasson et al. | 236/93 R |
| 5,479,786 | 1/1996 | Giasson et al. | 62/222 |

*Primary Examiner*—William E. Tapolcai
*Attorney, Agent, or Firm*—Russell E. Baumann; Richard L. Donaldson

[57] ABSTRACT

A flow regulating valve (100) for an air conditioning system is shown in which a body member (104) is provided with a fixed passageway (104a) and a variable passageway (104b) which results in regulating flow of refrigerant into the evaporator of the air conditioning system. Under high ambient and low or idle speeds, the system refrigerant pressure rises. This increases pressure in the evaporator and an increase in the saturation temperature of refrigerant in the evaporator. This increase in temperature is sensed by a helical thermostatic metal element (110) which moves to rotate an inlet sleeve (112) having a web (104c) formed between first and second windows (112a, 112b) to move into alignment with the inlet port (104c) of passageway (104b) to increase restriction to the flow of the refrigerant fluid through the valve thereby decreasing pressure of the refrigerant entering the evaporator. Upon continued increase in ambient temperature, the web continues to rotate bringing window (112b) into alignment with the inlet (104c) to increase refrigerant flow to prevent excessive pressure build-up in the compressor with resulting compressor cycling.

7 Claims, 5 Drawing Sheets

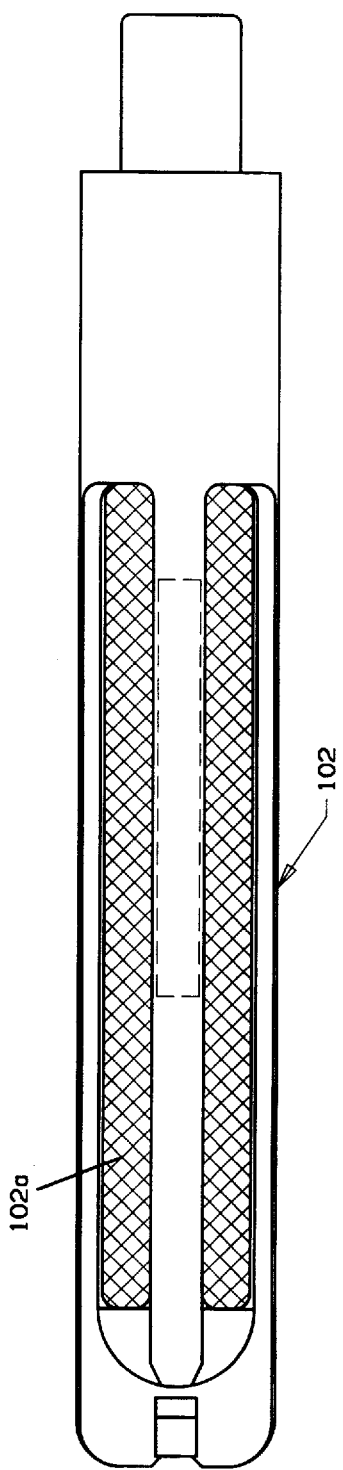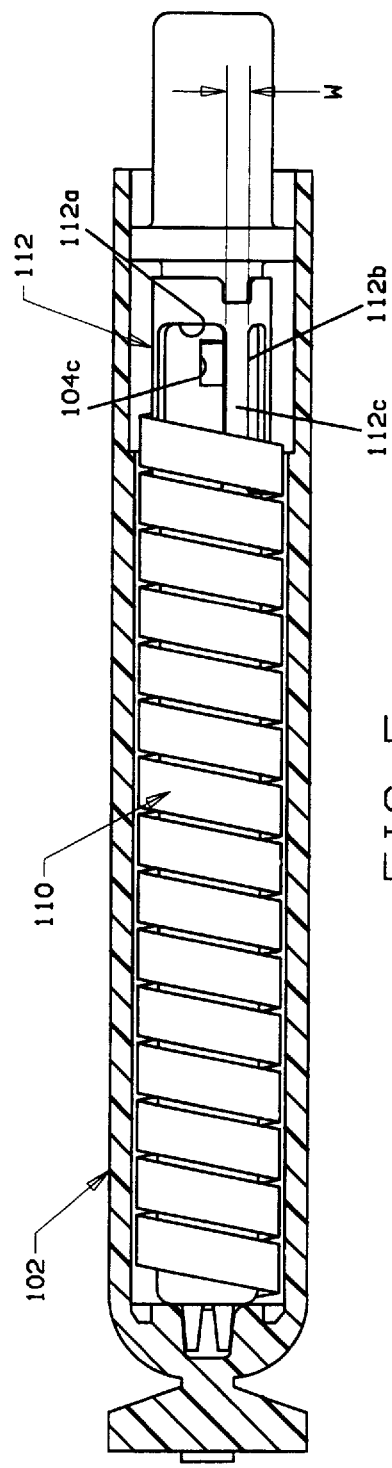

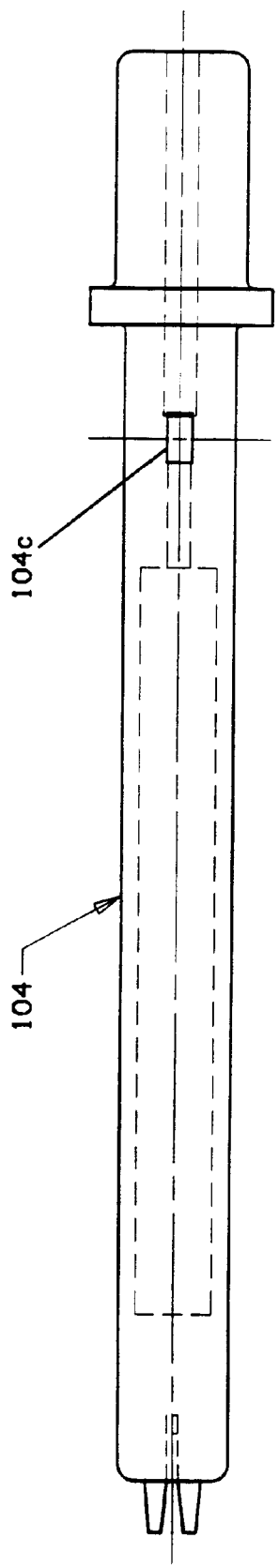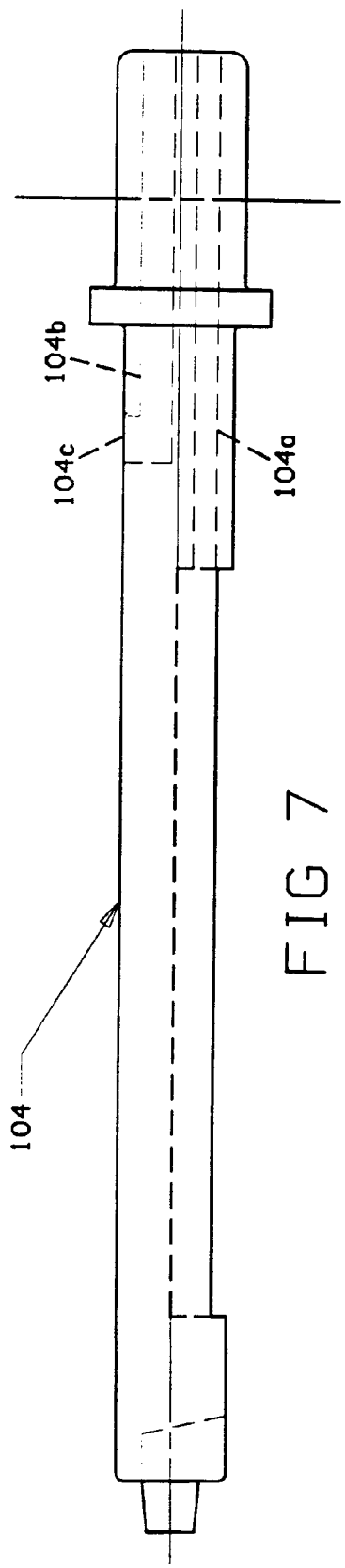

FLOW REGULATING VALVE APPARATUS FOR AIR CONDITIONING SYSTEMS

This application claims priority under 35 USC Section 119 (e) (1) of provisional application No. 60/072,562 filed Jan. 23, 1998.

FIELD OF THE INVENTION

This invention relates generally to air conditioning systems and more particularly to a control valve for refrigerant entering an evaporator of an automotive air conditioning system.

BACKGROUND OF THE INVENTION

It is conventional in automotive air conditioning systems to use a control valve to regulate the flow of refrigerant into the evaporator. The control valve throttles flow of the refrigerant liquid passing from the condenser into the evaporator to thereby reduce the pressure of the refrigerant entering the evaporator and provide efficient operation of the system.

In U.S. Pat. No. 5,479,786, assigned to the assignee of the present invention, which is incorporated herein by this reference, a flow regulating device is disclosed and claimed which comprises a member sealingly received in a conduit of an air conditioning system. Passageways are formed in the member having an inlet on one side and an outlet on the other side of the seal. A temperature responsive thermostatic metal element has one end fixedly mounted to the member and an opposite end movable to open and close at least a portion of the inlet of a passageway in dependence upon the temperature of the thermostatic metal element. In certain ones of the several embodiments disclosed in the patent, the thermostatic metal element is formed into a helix with a movable end coupled to a sleeve rotatably mounted on the member and adapted to rotate in dependence upon the temperature of the thermostatic metal element to increase the amount of restriction for blocking the inlet of a passageway as the temperature of the refrigerant, and concomitantly the thermostatic metal element, increases.

Flow valves made in accordance with the teachings of the above patent are very effective in varying flow restriction in response to refrigerant temperature exiting the condenser wherein more restriction of the flow is provided at high temperatures occasioned by idling or stop and go driving in especially high environmental temperatures and less restriction of the flow is provided at low or road temperatures and with variable flow provided in between the two extremes to obtain improved cooling efficiency. However, under especially heavy load conditions, full restriction can result in excessive pressure of the compressor causing disengagement of the compressor clutch so that the compressor is no longer driven by the engine. This in turn results in substantial loss of cooling efficiency and a general increase in cabin temperature of the vehicle.

SUMMARY OF THE INVENTION

It is an object of the present invention to provide a flow regulating valve for air conditioning systems which overcomes the above noted prior art limitation. Another object of the invention is the provision of a simple, reliable and relatively inexpensive valve which will regulate refrigerant flow into an evaporator to obtain efficient operation of an air conditioning system, particularly at high load conditions. Yet another object is the provision of a control valve for regulating refrigerant flow which can be easily manufactured and assembled and one which has a long, useful life. Other objects and features of the invention will be in part apparent and in part pointed out hereinafter.

Briefly, a flow regulating valve made in accordance with the invention comprises a body receivable in a conduit of an air conditioning system with means to provide a seal between the body and the conduit. At least one passageway is provided which extends from an inlet side to an outlet side of the seal means. A temperature responsive helical thermostatic metal element has one end fixedly mounted relative to the body and an opposite end fixed to a sleeve rotatably mounted on the body. The sleeve has first and second windows spaced apart by a web of a selected width. The sleeve is caused to rotate by the helical thermostatic metal element in dependence upon the temperature of the element so that at low temperatures the first window is aligned with the inlet of the passageway to achieve maximum refrigerant flow through the valve and as the temperature of the refrigerant increases, thereby increasing the temperature of the thermostatic element, the web moves across the inlet to variably restrict flow in dependence upon the temperature of the element until full restriction is achieved. Upon continued increase in temperature, e.g., caused by high load conditions, the second window comes into alignment with the inlet to decrease the restriction and increase refrigerant flow to avoid excessive compressor pressure and disengagement of the compressor clutch.

BRIEF DESCRIPTION OF THE DRAWINGS

FIG. 4 is an enlarged top elevational view of the FIG. 3 valve shown without the diffuser at the outlet end;

FIG. 5 is an enlarged front elevational view of the FIG. 4 structure with the filter member shown in cross section;

FIG. 6 is a front elevational view of the valve body of the FIG. 3 valve, shown in reduced scale;

FIG. 7 is a top elevational view of the FIG. 6 valve body;

DETAILED DESCRIPTION OF THE PREFERRED EMBODIMENT

Figure 1:
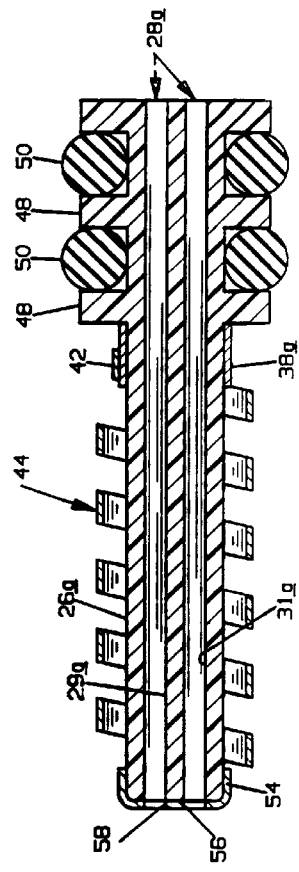
FIG. 1 is a cross sectional front elevational view of a flow regulating valve, made in accordance with the prior art, with a filter section removed for purposes of illustration.
Figure 2:
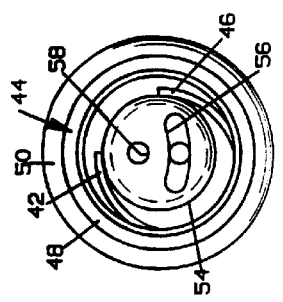
FIG. 2 is an end view thereof.

A prior art control valve is shown in FIGS. 1 and 2. FIG. 1 shows a cross section taken along a longitudinal axis of member 26a formed of suitable material such as low coefficient of friction polytetrafluorethylene. Thermostatic metal element 44 has end 42 fixedly attached to sleeve 38a which in turn is fixedly attached to member 26a in any suitable manner as by providing opposed flat surfaces on the periphery of member 26a and forming sleeve 38a with a corresponding configuration. Movable end 46 of thermostatic element 44 is fixedly attached to an end cap 54 which is rotatably mounted on the inlet end of member 26a. End cap 54 is formed with an arcuately shaped slot 56 which is aligned with passage 31a of passageway 28a. Passage 31a extends the full longitudinal length of member 26a from the inlet end to an opposite outlet end. A second opening, bore 58, is formed in end cap 54 which is movable into and out of alignment with passage 29a of passageway 28a also extending the full longitudinal length of member 26a. Due to the arcuate shape of slot 56, passage 31a is open for the entire range of rotational movement of end cap 54 for the temperatures of concern. Under operating conditions calling for the lesser degree of flow restriction, bore 58 is aligned with passage 29a so that refrigerant flows through both passages 29a and 31a of passageway 28a but when there is an increase in condenser pressure which results in an increase in temperature of the refrigerant liquid the helical thermostatic element rotates to an angular orientation where passageway 29a is fully or partially blocked but leaving passage 31a open. As a result, the flow through passageway 28a is further restricted and the pressure of the refrigerant leaving the control valve is reduced. Passages 29a and 31a are both formed of circular bores having a diameter of approximately 0.047 inches.

Figure 3:
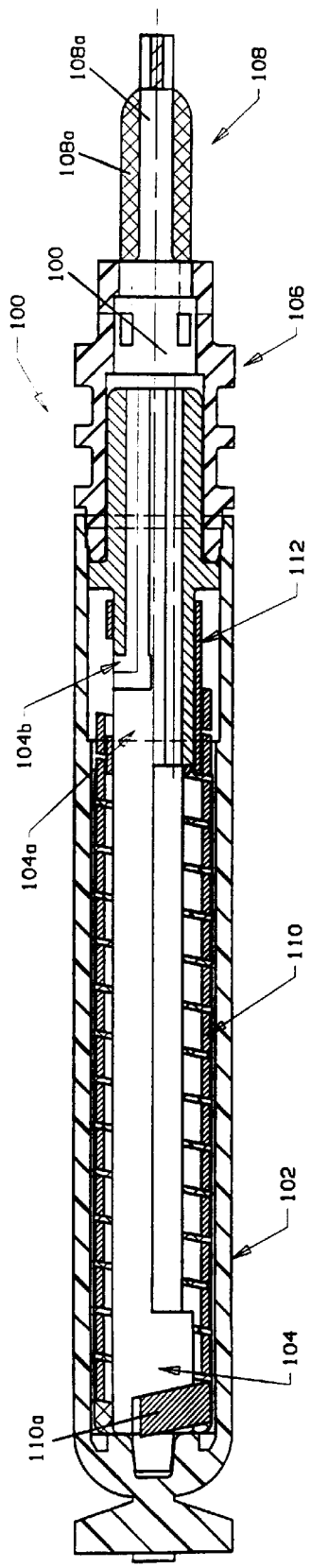
FIG. 3 is a cross sectional front elevational view of a flow regulating valve made in accordance with a preferred embodiment of the invention, shown in reduced scale.

With particular reference to FIG. 3, a variable orifice valve 100 made in accordance with the invention is shown having a generally cylindrical filter shell 102 in which valve body 104 is received. Valve body 104 has a first passage 104a and a second passage 104b extending from an inlet side of sealing o-ring means 106 mounted on diffuser 108 to an outlet side 108a. A helical thermostatic metal element 110 has one end 110a fixedly mounted to body 104 and an opposite end fixedly mounted, as by welding, to an inlet sleeve 112 rotatably mounted on body 104. Filter shell 102 is provided with a mesh section 102a (FIG. 4) formed of nylon or other suitable material having a selected mesh such as 275 microns and diffuser 108 is provided with a mesh section 108a which may be formed of the same or similar material having another selected mesh, such as 130 microns.

As seen in FIG. 5, inlet sleeve 112 comprises a generally cylindrical body or sidewall formed of suitable material such as stainless steel having first and second generally rectangular windows 112a, 112b respectively, spaced apart by a web 112c having a selected width in the circumferential or "w" direction as shown in the figure. The windows are movable into and out of alignment with generally rectangular inlet 104c of passage 104b in body 104 as sleeve 112 rotates when the helical coil 110 expands and contracts in dependence upon temperature change. The windows are somewhat elongated in the direction of the longitudinal axis 102a to accommodate any longitudinal sliding movement of the sleeve incident to such expansion and contraction.

During the normal mode of operation sleeve 112 will be positioned so that inlet 104c is somewhere between a maximum restriction, with web 112c aligned with inlet 104c, and fully opened, with window 112a aligned with inlet 104c. In the event of higher than normal operating temperatures which would cause an increase in pressure in the compressor, window 112b starts to move into alignment with inlet 104c to increase refrigerant flow. This avoids having the pressure build-up to a level which would cause the compressor clutch to disengage.

Figure 8:
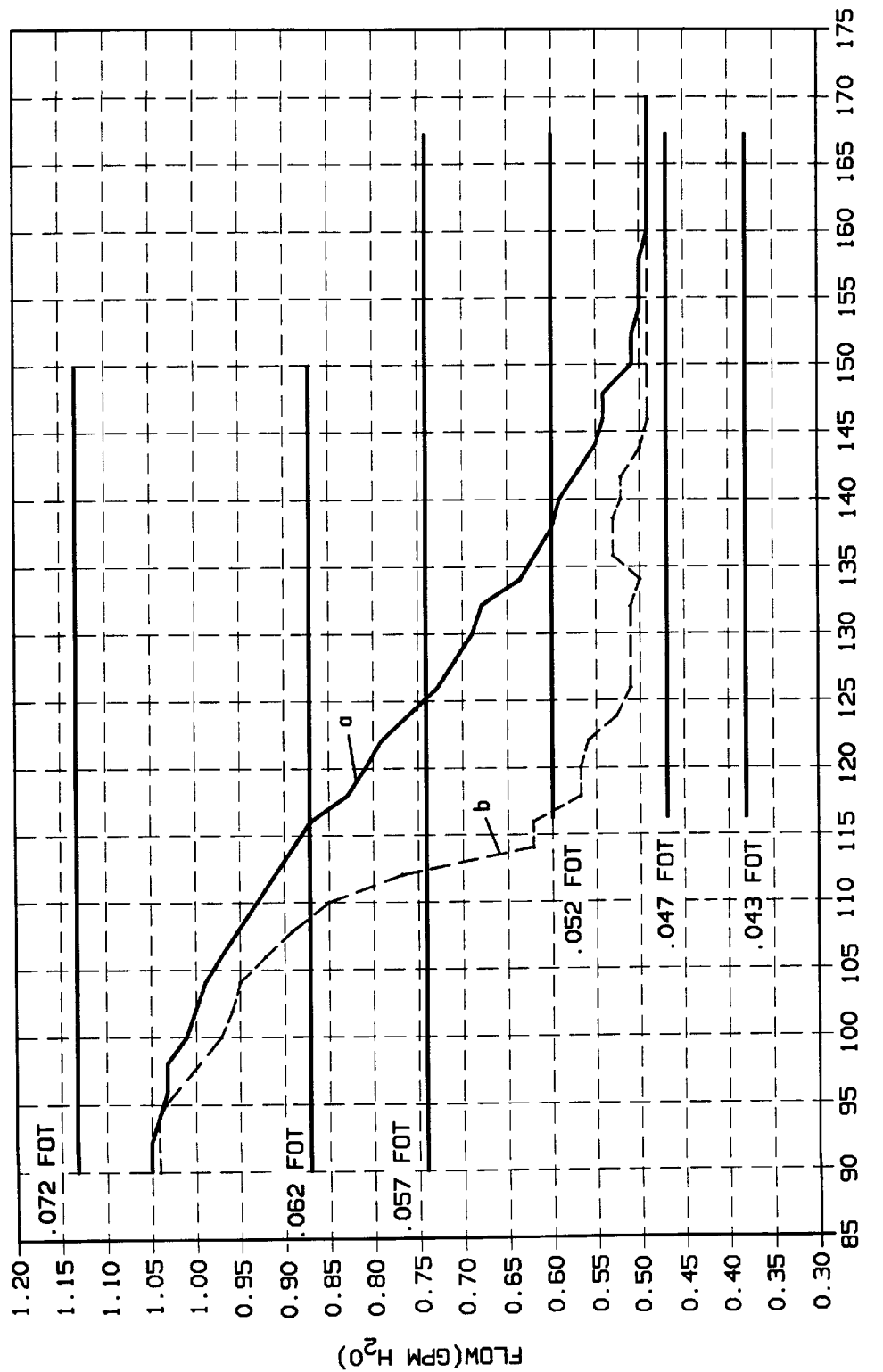
FIG. 8 is a graph showing the results of a test reflecting liquid flow through a valve body having a single window inlet sleeve with increasing and decreasing temperature.
Figure 9:
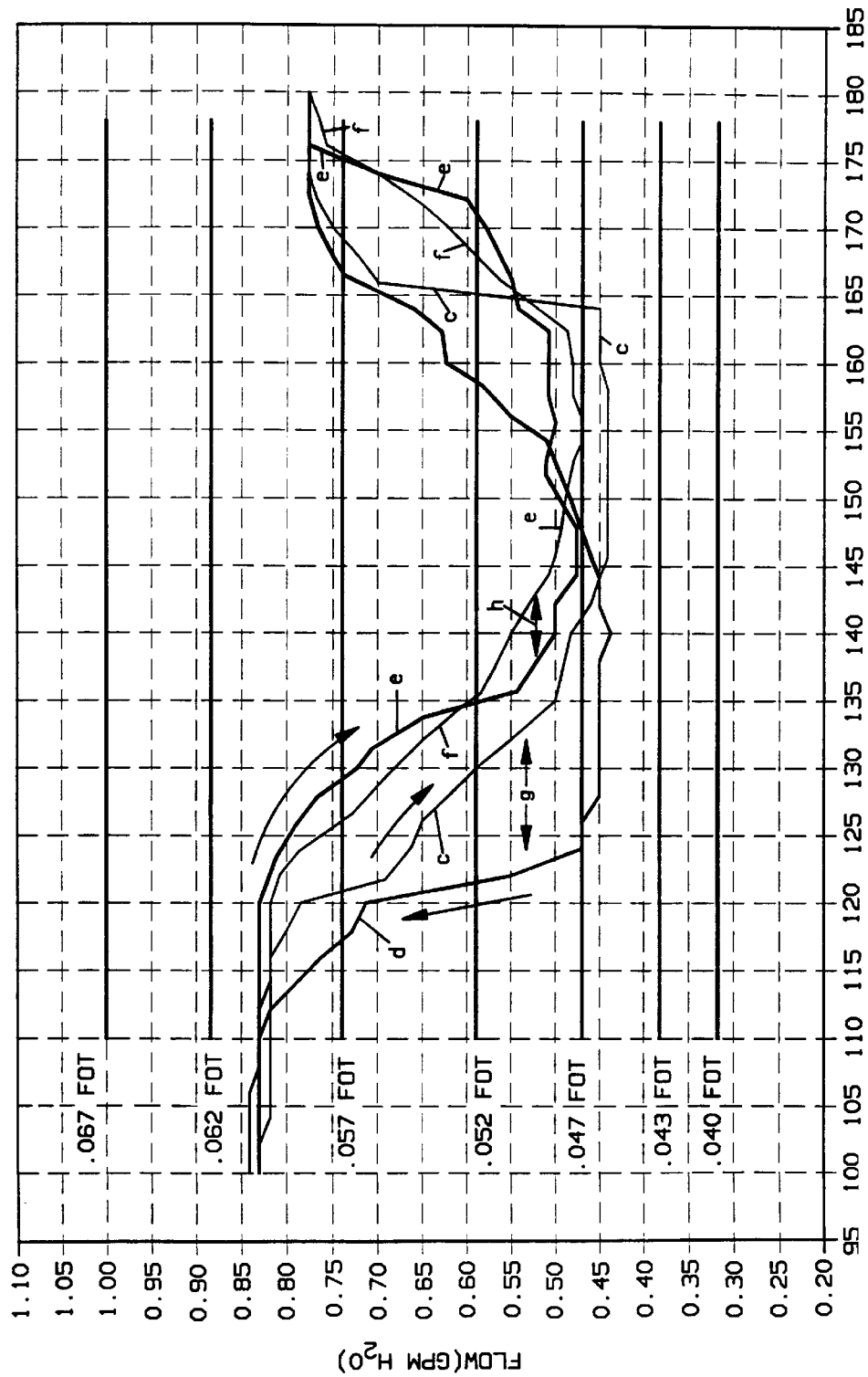
FIG. 9 is a graph similar to FIG. 8 showing the results of a test of a valve body using two different inlet sleeves having first and second windows, one having a web separating the windows of approximately 0.042 inches and the second having a web separating the windows of approximately 0.048 inches.

With reference to FIG. 8 which shows a graph of flow versus temperature for a single window variable valve having a fixed and a variable passage tested in water with increasing temperature shown at "a" and decreasing temperature at "b" it will be seen that flow is restricted at the higher temperature levels. In FIG. 9 the results of similar tests of two different valves is shown both having a double window sleeve made in accordance with the invention used with a body 104 having an opening of inlet 104c in the direction of "w" of approximately 0.044 inch. Curves "c" and "d" represent increasing and decreasing temperatures, respectively, of an inlet sleeve having a web of approximately 0.048 inches in the "w" direction or circumferential direction, approximately 0.004 inch greater than the "w" dimension of inlet opening 104c. Curves "e" and "f" represent increasing and decreasing temperatures, respectively, of an inlet sleeve having a web of approximately 0.042 inches in the direction of "w", approximately 0.002 inch less than the "w" dimension of inlet opening 104c. It will be seen that in both valves flow increases from a minimum at the full restriction level at some elevated temperature as the temperature continues to increase. It will also be noted that curve "f" for decreasing temperature closely follows curve "e" for increasing temperature whereas curve "d" has a greater degree of hysteresis relative to curve "c", as noted by "g" compared to "h". Thus while both valves provide an increasing flow level from the fully restricted state, as temperatures increase beyond temperature levels causing full restriction, the valve having the 0.042 inch web provides less hysteresis and is preferred.

In view of the above, it will be seen that the several objects of the invention are achieved. In carrying out the invention, a reliable, simple and easily assembled device provides additional restriction to the flow of refrigerant under conditions of high condenser pressure by means of a temperature responsive thermostatic element followed by a decreased restriction, i.e., increased flow of the refrigerant, as temperature continues to increase to avoid having the compressor pressure rise to the level where the compressor clutch would disengage causing the compressor to cycle with concomitant loss of cooling.

It will be appreciated that various changes could be made in the above construction without departing from the scope of the invention. For example, the rotatable sleeve having the web separated windows could form an end cap of body 104 in the manner shown in FIG. 1 of the prior art with another aperture formed adjacent to aperture 58 with the wall of the end cap between the apertures serving as the web. It is intended that all the matter included in the above description or shown in the accompanied drawings be interpreted as illustrative and not in a limiting sense.

What is claimed:

1. A regulating valve for use in an air conditioning system comprising a body having a longitudinal axis receivable in a conduit of the air conditioning system, seal means comprising an annular seal formed about the valve to provide a seal between the body and the conduit, the seal means having an inlet side and an outlet side, a passageway in the body having an inlet port on the inlet side of the seal means and an outlet port on the outlet side of the seal means, a sleeve member having a wall having first and second windows separated from one another by a web having a selected width between the windows and a temperature responsive thermostatic multilayer metal element having two opposite ends, one end of the metal element fixedly mounted to the body and the other end of the metal element fixedly mounted to the inlet sleeve to variably change the restriction to flow of fluid through the inlet port of the passageway in dependence upon the temperature of the thermostatic metal element.

2. A regulating valve according to claim 1 in which the thermostatic metal element is in the form of a helix.

3. A regulating valve according to claim 1 in which the inlet port has a generally rectangular opening having a selected width in a circumferential direction and the web having a width in the same direction of approximately the same selected width.

4. A regulating valve according to claim 3 in which the selected width is approximately 0.042 inches.

5. A regulating valve according to claim 1 in which the inlet port has a generally rectangular opening having a width of approximately 0.044 inches in the circumferential direction and the web has a width of approximately 0.042 inch in the circumferential direction.

6. A regulating valve according to claim 1 in which the inlet port has a generally rectangular opening having a width of approximately 0.044 inches in the circumferential direction and the web has a width of approximately 0.048 inch in the circumferential direction.

7. A regulating valve according to claim 1 in which an additional passageway is formed in the body having an inlet port on the inlet side of the seal means and an outlet port on the outlet side of the seal means to provide a minimum fluid flow through the regulating valve.

* * * * *